US009386238B2

(12) United States Patent
Stratmann et al.

(10) Patent No.: US 9,386,238 B2
(45) Date of Patent: Jul. 5, 2016

(54) METHOD FOR PREPARING IMAGES IN NON-VISIBLE SPECTRAL RANGES, AND CORRESPONDING CAMERA AND MEASURING ARRANGEMENT

(75) Inventors: Martin Stratmann, Freiburg (DE); Jan-Frisco Evers-Senne, Lenzkirch (DE); Matthias Schmieder, Freiburg (DE); Jan Flusser, Praha (CZ); Fillip Sroubek, Praha (CZ)

(73) Assignee: TESTO AG, Lenzkirch (DE)

( * ) Notice: Subject to any disclaimer, the term of this patent is extended or adjusted under 35 U.S.C. 154(b) by 635 days.

(21) Appl. No.: 13/991,235

(22) PCT Filed: Jun. 1, 2011

(86) PCT No.: PCT/EP2011/002717
§ 371 (c)(1),
(2), (4) Date: Aug. 20, 2013

(87) PCT Pub. No.: WO2012/072151
PCT Pub. Date: Jun. 7, 2012

(65) Prior Publication Data
US 2013/0321638 A1    Dec. 5, 2013

(30) Foreign Application Priority Data

Dec. 3, 2010   (DE) .......................... 10 2010 053 458

(51) Int. Cl.
*H04N 5/30*      (2006.01)
*G06T 3/40*      (2006.01)
(Continued)

(52) U.S. Cl.
CPC ................ *H04N 5/30* (2013.01); *G06T 3/4061* (2013.01); *H04N 5/23245* (2013.01); *H04N 5/33* (2013.01)

(58) Field of Classification Search
CPC ....... H04N 5/30; H04N 5/23245; H04N 5/33; G06T 3/4061
USPC .......................................................... 348/162
See application file for complete search history.

(56) References Cited

U.S. PATENT DOCUMENTS

| 7,340,162 | B2 * | 3/2008 | Terre | ........................ | G06T 5/009 |
| | | | | | 250/330 |
| 2005/0024494 | A1 * | 2/2005 | Hirota | ...................... | B60R 1/00 |
| | | | | | 348/148 |

(Continued)

FOREIGN PATENT DOCUMENTS

| JP | 2006140885 | 6/2006 |
| JP | 2009059132 | 3/2009 |

(Continued)

OTHER PUBLICATIONS

Mohammad S. Alam et al., "Infrared Image Registration and High-Resolution Reconstruction Using Multiple Translationally Shifted Aliased Video Frames", IEEE Transactions of Instrumentation and Measurement, IEEE Service Center, Piscataway, NJ, vol. 49, No. 5, Oct. 1, 2000, pp. 915-923.

(Continued)

*Primary Examiner* — Allen Wong
(74) *Attorney, Agent, or Firm* — Volpe and Koenig, P.C.

(57) ABSTRACT

In a thermal imaging camera (1), an infrared image data stream (5) of infrared images (4) is captured during a random movement of the thermal imaging camera (1), and the infrared images (4) are combined into a higher-resolution infrared image (9).

11 Claims, 4 Drawing Sheets

(51) Int. Cl.
*H04N 5/232* (2006.01)
*H04N 5/33* (2006.01)

(56) References Cited

U.S. PATENT DOCUMENTS

2006/0133648 A1* 6/2006 Meunier ............ H04B 10/1149
382/103
2009/0144003 A1* 6/2009 Murata .................... G06T 7/00
702/66

FOREIGN PATENT DOCUMENTS

| JP | 4494505 | 6/2010 |
| JP | 2011523538 | 8/2011 |
| WO | 2009126445 | 10/2009 |
| WO | 2009151903 | 12/2009 |

OTHER PUBLICATIONS

Min Kyu Park et al, "Super-Resolution Image Reconstruction: A Technical Overview", IEEE Signal Processing Magazine, IEEE Service Center, Piscataway, NJ, vol. 20, Nr. 3, May 1, 2003, pp. 21-26.
Euncheol Choi et al., "Super-Resolution Approach to Overcome Physical Limitations of Imaging Sensors: An Overview", International Journal of Imaging Systems and Technology, Wiley and Sons, New York, vol. 14, No. 2, Jan. 1, 2004, pp. 36-46.
Baker S. et al., "Limits on Super-Resolution and How to Break Them", IEEE Transactions on Pattern Analysis and Machine Intelligence, IEEE Service Center, Los Alamitos, CA, vol. 24, No. 9, Sep. 1, 2002, pp. 1167-1183.
Sroubek Filip et al., "A Unified Approach to Superresolution and Multichannel Blind Deconvolution", IEEE Transactions on Image Processing, IEEE Service Center, Piscataway, NJ, vol. 16, No. 9, Sep. 1, 2007, pp. 2322-2332.
Smith Steven W., "The Scientist and Engineer's Guide to Digital Signal Processing, Chapter 24: Linear Image Processing", Jan. 1, 1997, pp. 397-422.
Zomet A. et al., "Robust Super-Resolution", Proceedings 2001 IEEE Conference on Compute Vision and Pattern Recognition, CVPR 2001, Kauai, Hawaii, Dec. 8-14, 2001; [Proceedings of the IEEE Computer Conference on Computer Vision and Patterns Recognitiion], Los Alamitos, CA, IEEE Comp. Soc. US, vol. 1, Dec. 8, 2011, pp. 645-650.
Hardie C. Russell et al., "Joint MAP Registration and High-Resolution Image Estimation Using a Sequence of Undersampled Images", IEEE Transactions on Image Processing, IEEE Service Center, Piscataway, NJ, US, vol. 6, No. 12, Dec. 1, 1997.
Elad M. et al., "Fast and Robust Multiframe Super Resolution", IEEE Transactions on Image Processing, IEEE Service Center, Piscataway, NJ, US, vol. 13, No. 10, Oct. 1, 2004, pp. 1327-1344.
Tipping Michael E, et al., "Bayesian Image Super-Resolution", Advances in Neural Information Processing Systems, Jan. 1, 2002, pp. 1303-1310.
Irani Michael, et al., "Improving Resolution by Image Registration", 2435a Graphical Models and Image Processing, 53 May 1991, No. 3, Duluth, MN, pp. 1-9.

* cited by examiner

METHOD FOR PREPARING IMAGES IN NON-VISIBLE SPECTRAL RANGES, AND CORRESPONDING CAMERA AND MEASURING ARRANGEMENT

BACKGROUND

The invention relates to a method for preparing NON-VIS (non-visible) images, and to a corresponding camera and a corresponding measuring arrangement.

Thermal imaging cameras are known as an example of such cameras for recording in a non-visible spectral range.

In the case of the known thermal imaging cameras, it is often desirable to improve the resolution that can be obtained by the detector unit present.

In principle, an option for improving the obtainable resolution consists of increasing the number of pixels in the detector apparatus. However, this is complicated from a design point of view and undesirably increases the production costs of the thermal imaging camera.

Furthermore, UV (ultraviolet) cameras, THz (terahertz) cameras, microwave cameras and other cameras for recording NON-VIS images in a non-visible spectral range are also known and these have comparable problems.

WO 2009/126445 A1 discloses a method for improving short-wave infrared images which uses SR (superresolution) and local processing techniques, wherein an image with a relatively high resolution is produced by nearest-neighbor interpolation, bilinear interpolation or bicubic interpolation.

MOHAMMAD S ALAM ET AL: "Infrared Image Registration and High-Resolution Reconstruction Using Multiple Translationally Shifted Aliased Video Frames" IEEE TRANSACTIONS ON INSTRUMENTATION AND MEASUREMENT, IEEE SERVICE CENTER, PISCATAWAY, NJ, US, vol. 49, no. 5, Oct. 1, 2000 (2000-10-01) discloses a method for infrared image registration and high-resolution reconstruction using multiple translationally shifted and aliased video frames, in which a gradient-based registration algorithm is used to obtain an estimate of the shifts between the captured frames and a weighted nearest-neighbor approach is used to place the frames into a uniform grid to produce a high-resolution image.

MIN KYU PARK ET AL: "Super-resolution image reconstruction: a technical overview", IEEE SIGNAL PROCESSING MAGAZINE, IEEE SERVICE CENTER, PISCATAWAY, NJ, US, vol. 20, no. 3, May 1, 2003 (2003-05-01), pages 21-36 discloses a technical overview of superresolution image reconstructions.

EUNCHEOL CHOI ET AL: "Super-resolution approach to overcome physical limitations of imaging sensors: an overview" INTERNATIONAL JOURNAL OF IMAGING SYSTEMS AND TECHNOLOGY, WILEY AND SONS, NEW YORK, US, vol. 14, no. 2, Jan. 1, 2004 (2004-01-01), pages 36-46 discloses an overview of the superresolution approach to overcome physical limitations of imaging sensors.

BAKER S ET AL: "Limits on super-resolution and how to break them", IEEE TRANSACTIONS ON PATTERN ANALYSIS AND MACHINE INTELLIGENCE, IEEE SERVICE CENTER, LOS ALAMITOS, CA, US, vol. 24, no. 9, Sep. 1, 2002 (2002-09-01), pages 1167-1183 discloses using Gaussian functions as point spread functions in super-resolution reconstruction.

FILIP SROUBEK ET AL: "A Unified Approach to Super-resolution and Multichannel Blind Deconvolution", IEEE TRANSACTIONS ON IMAGE PROCESSING, IEEE SERVICE CENTER, PISCATAWAY, NJ, US, vol. 16, no. 9, Sep. 1, 2007 (2007-09-01), pages 2322-2332 discloses a unified approach to superresolution and multichannel blind deconvolution, in which a point spread function characterizing the imaging process is computed recursively in an optimization method.

Steven W. Smith: "The Scientist and Engineer's Guide to Digital Signal Processing, Chapter 24: Linear Image Processing", Jan. 1, 1997 (1997-01-01), pages 397-422 discloses linear image processing methods for processing images in the visible spectral range, in which two techniques are described for reducing the time required for implementation: convolution by separability and FFT convolution.

ZOMET A ET AL: "Robust super-resolution", PROCEEDINGS 2001 IEEE CONFERENCE ON COMPUTER VISION AND PATTERN RECOGNITION. CVPR 2001. KAUAI, HAWAII, DEC. 8-14, 2001; [PROCEEDINGS OF THE IEEE COMPUTER CONFERENCE ON COMPUTER VISION AND PATTERN RECOGNITION], LOS ALAMITOS, CA, IEEE COMP. SOC, US, vol. 1, Dec. 8, 2001 (2001-12-08), pages 645-650 discloses a method for robust super-resolution, in which a robust median estimator is combined in an iterative process to achieve a superresolution algorithm, wherein the process can increase the image resolution even in regions with outliers, where other superresolution methods actually degrade the image.

RUSSELL C HARDIE ET AL: "Joint MAP Registration and High-Resolution Image Estimation Using a Sequence of Undersampled Images" IEEE TRANSACTIONS ON IMAGE PROCESSING, IEEE SERVICE CENTER, PISCATAWAY, NJ, US, vol. 6, no. 12, Dec. 1, 1997 (1997-12-01) discloses a method for the maximum a posteriori registration and high-resolution image estimation, in which a sequence of undersampled images is used.

ELAD M ET AL: "Fast and Robust Multiframe Super Resolution", IEEE TRANSACTIONS ON IMAGE PROCESSING, IEEE SERVICE CENTER, PISCATAWAY, NJ, US, vol. 13, no. 10, Oct. 1, 2004 (2004-10-01), pages 1327-1344 discloses a method for fast and robust multiframe super-resolution, in which a high-resolution, experimentally produced image is shifted prior to convolution with a point spread function.

Michael E. Tipping ET AL: "Bayesian Image Super-Resolution", Advances in Neural Information Processing Systems, Jan. 1, 2002 (2002-01-01), pages 1303-1310 discloses a method for Bayesian image superresolution, in which an unknown point spread function is estimated.

SUMMARY

The invention is therefore based on the object of improving by other means the obtainable resolution in a thermal imaging camera or in any other camera for recording NON-VIS images in a non-visible (NON-VIS) spectral range.

According to the invention, in order to achieve this object, provision is made in the method mentioned at the outset. Thus, in particular, it is proposed that, during and/or before and after a random movement of a camera for recording NON-VIS images in a non-visible spectral range, a NON-VIS image data stream of NON-VIS images is recorded with a recorded-image resolution and, as a result of combining the recorded NON-VIS images, a prepared SR image with an output-image resolution is generated, with the output-image resolution being greater than the recorded-image resolution. Hence the method according to the invention provides an SR image with an increased image resolution compared to the individual NON-VIS images. Here, the processed image can contain all measured values or a subset of the measured values from a detector.

A NON-VIS image is understood to be a one-dimensional, two-dimensional, three-dimensional or multidimensional arrangement of measured values, which for example reproduces a spatial or spatial-temporal assignment of the measured values. It is particularly advantageous for the invention if the NON-VIS image represents a two-dimensional arrangement of measured values.

Here, the camera can for example be designed to record NON-VIS images in an IR (infrared), LTV (ultraviolet), THz and/or microwave spectral range.

The random movement can be created in a variety of ways. By way of example, the camera can be operated in hand-held fashion, and so the random movement emerges from an involuntary movement of the hand.

Provision can also be made for the camera to be mounted on a vehicle. In this case, the random movement can emerge from the movement of the moving vehicle carrying the camera.

The random movement can also be created differently.

In general, the term image data stream denotes a collection or sequence of images, which need not necessarily be available in a continuous data stream.

An application that should be highlighted is if the camera is designed to record in an IR spectral range and the camera therefore constitutes a thermal imaging camera. In this case, the NON-VIS images are present as IR images in an IR image data stream. According to the invention, provision is then made in a method for preparing IR images with an improved resolution, during and/or before and after a random movement of a preferably hand-held thermal imaging camera or a random movement of a moving vehicle carrying a thermal imaging camera and moving the latter concomitantly, for an IR image data stream of IR images to be recorded with a recorded-image resolution and for, as a result of combining the recorded IR images, a prepared SR-IR image with an output-image resolution to be generated, with the output-image resolution being greater than the recorded-image resolution. The invention therefore makes use of the discovery that, as a result of recording a plurality of IR images in an IR image data stream during a movement of the thermal imaging camera or before and after the movement, IR images are available for further processing, which differ slightly from one another and therefore, in combination, make it possible to drop below the restriction of the image resolution resulting from the pixels of the detector unit of the thermal imaging camera. In order to generate the image data stream, use can be made of the function for recording image series, which is often already available in current thermal imaging cameras. The recording time span required for generating the SR-IR image with higher resolution is only slightly longer than an individual recording because the combination of a few IR images already provides satisfactory results. Put simply, the random movement displaces the detector unit of the thermal imaging camera between the recordings of the individual IR images of the IR image data stream by a path which is shorter than the pixel spacing of the detector unit.

The utilized movement is random, i.e. the movement direction and the movement path are not known for carrying out the method. Here, a typical application is a hand-held (thermal imaging) camera, which is constantly subjected to random movements as a result of involuntary hand movements.

A further application is (thermal imaging) cameras, which are used as night-vision devices for assisting drivers in vehicles, for example in land vehicles such as passenger vehicles, goods vehicles, motorcycles, tracked vehicles or the like, in aircraft and/or in watercraft. In these cases, the invention utilizes the fact that even a (thermal imaging) camera which has been rigidly mounted on the vehicle is, during the vehicle movement, subjected to random, involuntary movements which can be used for the method according to the invention. Hence, the invention can provide the SR(-IR) image as improved night-vision image.

Provision can be made for an energy function to be optimized for the combination of the recorded NON-VIS images, with the energy function being evaluated on NON-VIS images tentatively combined to form an SR image. The use of an energy function provides a simple manageable criterion which, in one implementation of the optimization and the whole method, can be used and processed further in a computer unit. Using this evaluation criterion, it is possible to vary the tentatively generated SR images such that an optimum criterion, for example a maximum or a minimum, is achieved. Instead of an optimum, it is also possible to strive for a state in which the energy function only varies a little, for example within a predetermined threshold.

Provision can be made, prior to combining the recorded NON-VIS images, for a transform to be established for each NON-VIS image, by means of which the NON-VIS images are registered, more particularly registered with sub-pixel accuracy, with respect to one another or with respect to a reference. As a result of this, the number of possible combinations of the recorded NON-VIS images is already significantly restricted, as a result of which the computational capacity required for carrying out the optimization, in particular the storage requirement and/or the calculation time, can be reduced to such an extent that the method can also be executed on computer units which are already present in current thermal imaging cameras.

In order to evaluate the tentatively generated SR images and/or to generate these SR images, provision can be made, prior to combining the recorded NON-VIS images, for a point spread function to be assigned to each NON-VIS image from a stored test set of point spread functions, with the point spread functions of the test set simulating the optical imaging properties of the thermal imaging camera for different recording directions and/or different recording positions. The test set can be formed by different point spread functions and/or by different parameter values of a point spread function. Here, the invention utilizes the use, known per se, of point spread functions in the mathematical description of the optical imaging process. Preferably each NON-VIS image of the NON-VIS image data stream is assigned that point spread function which best describes the recording position assumed by the thermal imaging camera at the recording time of the respective NON-VIS image. Hence, the displacement calculated during the registration can be used to displace the point spread functions such that these just fit the displaced NON-VIS images into the grid of the SR image.

In the process, there is no need to know the actual recording position or recording direction at the recording time; rather, it is possible to assign to each recorded NON-VIS image that point spread function which corresponds to the transform respectively established during the registration. Here, the information in relation to the recording direction or recording position at the recording time of the respective NON-VIS image is used, said information being required for carrying out the method according to the invention and contained in the parameters of the established transform.

A comparatively small parameter space, sufficient for many applications, for describing the available transforms emerges if the test set stores point spread functions which describe different relative image displacements. Hence, a resources-saving implementation of the method according to the invention is possible. In particular, a blind deconvolution is not required.

In this case, the point spread functions can be parameterized by the associated image displacements. Here, the image displacements can constitute translations and/or rotations and/or scaling. A particularly small parameter space emerges if the test set stores point spread functions which can be transformed into one another by a pure translation. There are great calculational simplifications if the two-dimensional point spread functions are symmetrical and/or separable, i.e. if they can be represented as a product of two one-dimensional functions. It is particularly expedient for the point spread functions to be defined by delta functions. Here, the position of the center of the delta function can easily be used to describe the relative image displacement.

For the purposes of optimization, provision can be made for the energy function to evaluate the deviation of the recorded NON-VIS images from the tentative SR image, which is imaged with the respectively selected, i.e. for each NON-VIS image, point spread function. The deviation is preferably calculated by forming the difference and the magnitude. What can thus be achieved is that the energy function assumes an optimum value if the SR image deviates as little as possible from the scene recorded by the NON-VIS image data stream. Mathematically, this is achieved by virtue of the fact that the optimum SR image is best at reproducing the NON-VIS images actually recorded in the NON-VIS image data stream for the selected point spread functions.

As a start point of the optimization of the energy function, a test pixel matrix of the output-image resolution can be filled with image values of the NON-VIS images, depending on the respectively established transform and/or the respectively assigned point spread function, and be used as tentatively generated SR image. As a result of this, it is possible to achieve for many applications that the start point already lies in the vicinity of the optimum, as a result of which it is again possible to save computational resources.

A NON-VIS image can be selected from the NON-VIS image data stream as NON-VIS reference image as reference for the registration.

If the method is to be carried out continuously, i.e. without interruption, provision can be made for the method to be carried out with a NON-VIS reference image co-moving within the progressing NON-VIS image data stream. It is advantageous in this case that the image displacements of the NON-VIS images caused by the random movement of the thermal imaging camera do not become too large with respect to the reference. Prior to restricting the required memory area for the method according to the invention, provision can be made for the method to be carried out continuously with selected NON-VIS images co-moving within the progressing NON-VIS image data stream. Hence, earlier recorded NON-VIS images are discarded as soon as they are no longer required for the current calculation of the higher resolution SR image. If the output-image resolution of the SR image is $SR_F$-times the image resolution of the NON-VIS images, at least or precisely $SR_F^2+1$ NON-VIS images are preferably selected and evaluated in the method according to the invention. In many cases, $SR_F^2$ NON-VIS images or even $SR_F$ NON-VIS images already suffice.

Provision can be made for the SR image to be varied during the optimization of the energy function, for example by using a gradient method.

Alternatively, or in addition thereto, provision can be made for the point spread functions assigned to the NON-VIS images to be varied during the optimization of the energy function, for example by displacing the centre of the respective point spread function.

It is additionally possible to save computational resources if the registration with the sub-pixel accuracy for each NON-VIS image is established in a two-stage method, with, in a first method step, an approximate registration being established and with, in a second method step, the registration with sub-pixel accuracy being established by means of an optical flow. The approximate registration, which results in a registration of the NON-VIS images with respect to one another with an accuracy of approximately the pixel spacing of the detector unit, can for example be established by means of a phase-correlation method or in another fashion. As a result of sub-dividing the method steps into two, it is possible to restrict the computational complexity for the registration with sub-pixel accuracy.

The registration with sub-pixel accuracy is preferably established pixel-by-pixel. Here, provision can be made for those pixel values which deviate from the respectively established registration, in particular from the mean of direction and magnitude of the displacement, by more than a predetermined threshold to be masked in the respective NON-VIS image. This makes it possible to prevent so-called outliers or else aberrations of the recording optical unit from placing an unnecessary load on the optimization method or even leading to erroneous results.

In order to simulate the imaging process mathematically, particularly when evaluating the energy function, provision can be made for the convolution of the respective SR image with the respective point spread function to be calculated when imaging the SR images with the selected point spread functions.

In order to achieve the object, the method according to the invention should be used in a thermal imaging camera which has a detector unit designed to generate a NON-VIS image data stream of NON-VIS images, an image-processing unit designed to process the NON-VIS image data stream and an output unit designed to output prepared SR images, with the image-processing unit being designed to carry out the method according to the invention, for example by programming a computer unit, and with the recorded-image resolution being defined by the detector unit and the output-image resolution being greater than the recorded-image resolution. Provision can be made for the output-image resolution to be predetermined by the output unit, for example by the technical capabilities of the output unit. The output unit therefore provides a resolution which permits the prepared SR image or part thereof to be output.

By way of example, the output can take place via a data interface or via a display.

In order to achieve the object, the method according to the invention can also be used in a measuring arrangement, which comprises a camera for recording NON-VIS images in a non-visible spectral range, more particularly a thermal imaging camera, with the camera having a detector unit designed to generate a NON-VIS image data stream of NON-VIS images, an image-processing unit designed to process the NON-VIS image data stream and an output unit designed to output prepared SR images, and which is furthermore characterized in that the image-processing unit is designed to carry out a method according to the invention, with the recorded-image resolution being predetermined by the detector unit and the output-image resolution being greater than the recorded-image resolution. Here, the image-processing unit can be integrated into the camera or designed separately therefrom. The image-processing unit can be operated during the operating time of the camera, or subsequently thereto.

The invention will now be described in more detail on the basis of an exemplary embodiment; however, it is not restricted to this exemplary embodiment. Further exemplary embodiments emerge from combining individual, or a plurality of, features from the claims with respect to one another and/or with individual, or a plurality of, features of the exemplary embodiment.

For simplification purposes, the camera is assumed to be present as a thermal imaging camera in the explained exemplary embodiment. In further exemplary embodiments, it is also possible to use a camera for recording in a different non-visible spectral range, for example a camera for recording images in the UV, THz and/or microwave spectral range.

For the purpose of demonstrating the invention, the NON-VIS images are referred to as IR images in the description of the exemplary embodiment; also, the NON-VIS image data stream is referred to as IR image data stream, the camera for recording in a non-visible spectral range is referred to as thermal imaging camera, the detector unit is referred to as IR detector unit and the SR image is referred to as SR-IR image.

BRIEF DESCRIPTION OF THE DRAWINGS

In detail.

DETAILED DESCRIPTION OF THE PREFERRED EMBODIMENTS

Figure 1:
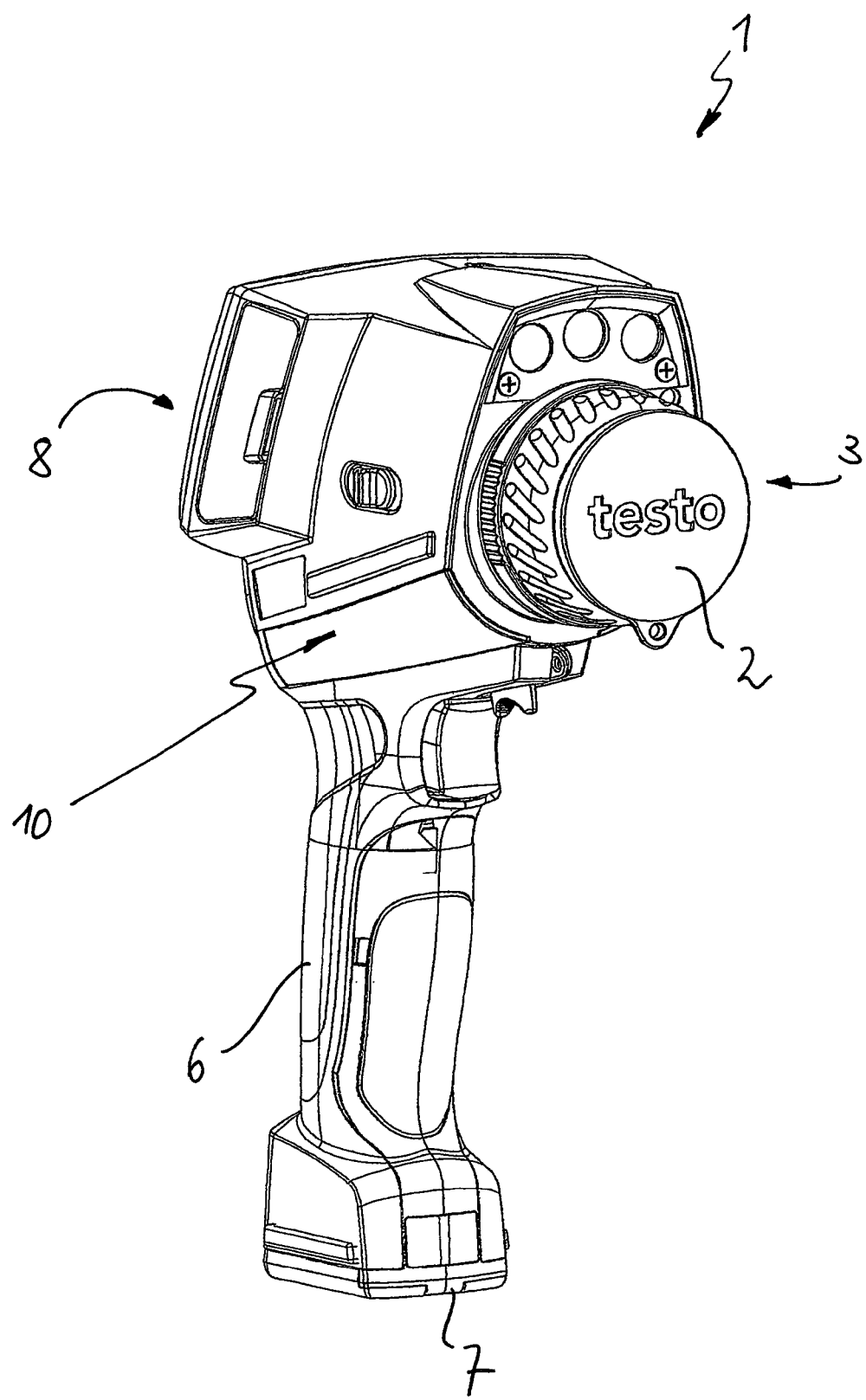
FIG. 1 shows a perspective view from the front of a thermal imaging camera according to the invention.
Figure 2:
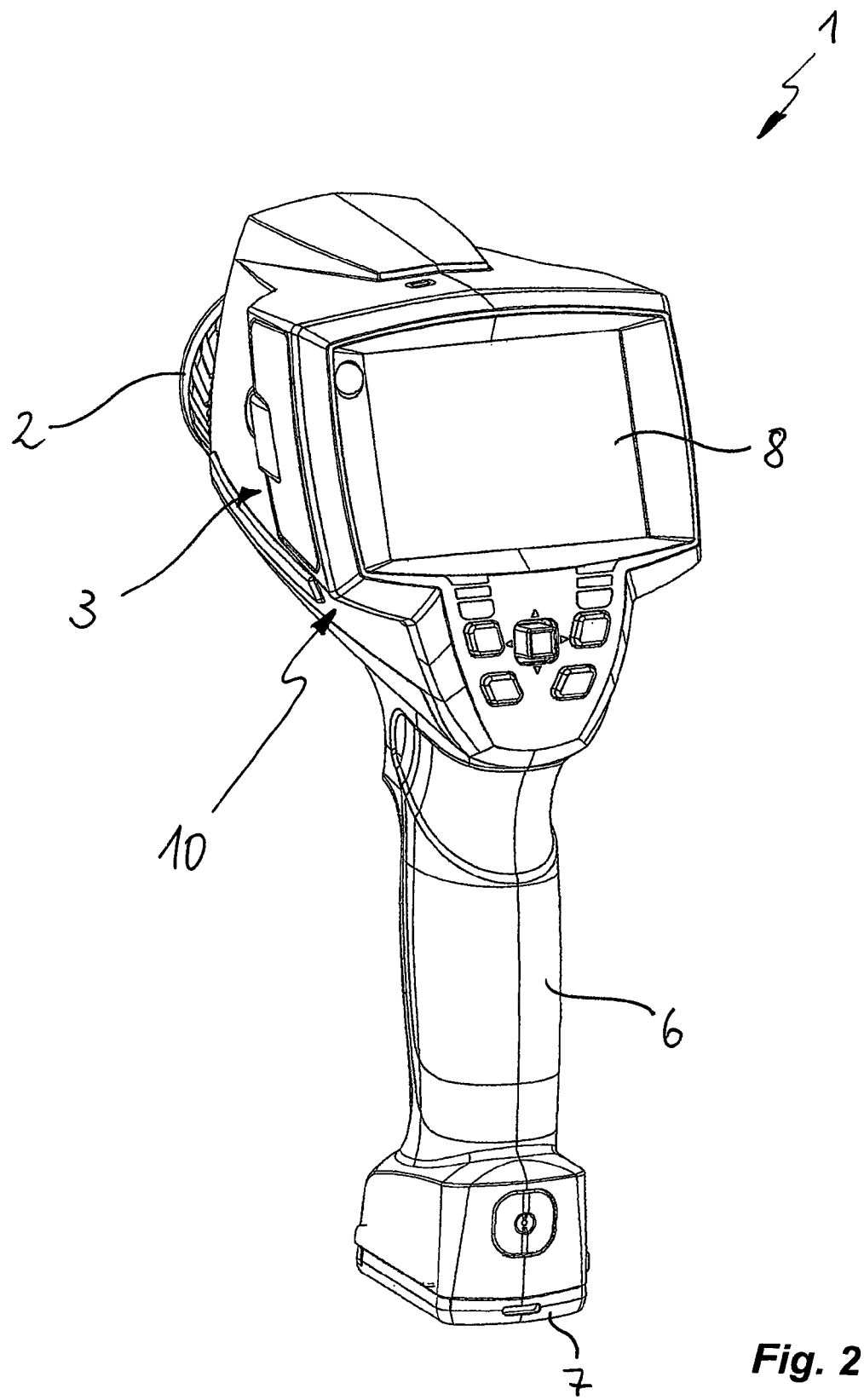
FIG. 2 shows a perspective view from the rear of the thermal imaging camera as per FIG. 1.

The thermal imaging camera shown in FIG. 1 and FIG. 2 and denoted by 1 overall has an IR detector unit 3 embodied and arranged in a manner known per se behind an IR optical unit 2.

Figure 4:
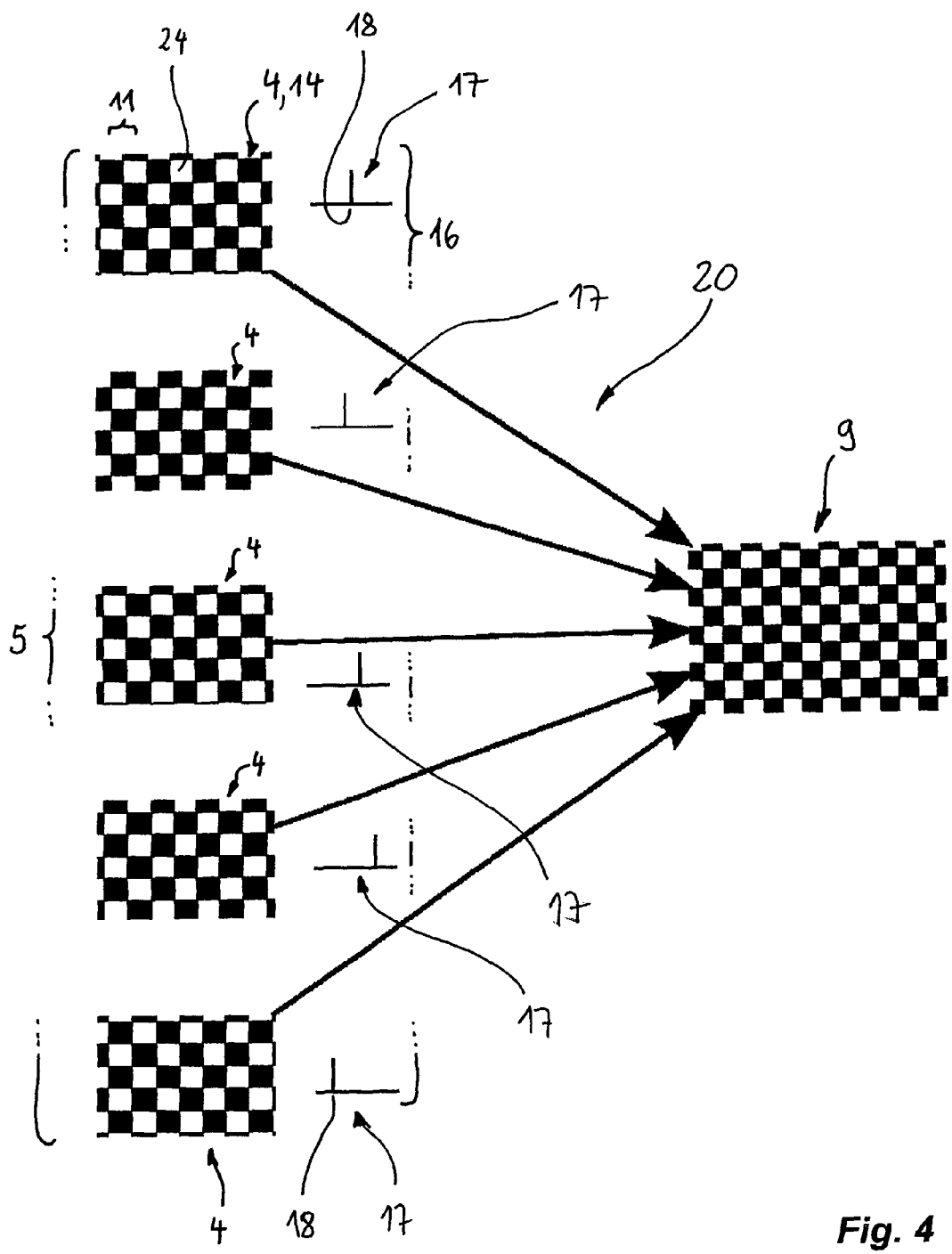
FIG. 4 shows a schematic diagram of the method according to the invention.

The IR detector unit 3 is designed to record IR images 4, shown schematically in FIG. 4, continuously in an IR image data stream 5. In order to clarify the pixelation of the IR images 4, the respective image content was replaced by a checker-board pattern.

The thermal imaging camera 1 is embodied as a hand-held instrument and provided with a handle 6 for hand-held operation, in which an energy store 7 for operating the thermal imaging camera 1 is arranged in detachable fashion.

The thermal imaging camera furthermore has an output unit 8, embodied as display, which is designed to reproduce an SR-IR image 9, shown schematically in FIG. 4, with an increased output-image resolution compared to the IR images 4. This higher output-image resolution is indicated by a greater number of fields in the checker-board pattern.

An image-processing unit 10 (not visible in any more detail) has been realized in a computer unit in the interior of the thermal imaging camera 1 and is designed to carry out the method according to the invention, which is described below on the basis of FIG. 3 and FIG. 4.

An IR image data stream 5 of IR images of a scene is recorded by the IR detector unit 3 during, or at least before and after, a random movement of the thermal imaging camera 1. These IR images 4 have a recorded-image resolution which is determined by the pixel spacing 11 of the IR detector unit.

The IR images 4 of the IR image data stream 5 selected to calculate the SR-IR image 9 are, in a first method step 12 of a registration method 13, approximately registered to the first IR image 4 of the IR image data stream 5, which is selected as IR reference image 14. In the described exemplary embodiment, this is brought about by a phase-correlation method, but the approximate registration can also be calculated in other ways in other exemplary embodiments.

In a second method step 15 of the registration method 13, the registration with sub-pixel accuracy of the IR images 4 with respect to one another and with respect to the IR reference image 14 is calculated by establishing the optical flow pixel-by-pixel between the IR images 4 in a manner known per se.

As a result, a parameter set of a transform is therefore available for each IR image 4, by means of which transform the IR images 4 can be registered with sub-pixel accuracy with respect to one another and with respect to the IR reference image 14. Here, with sub-pixel accuracy means a registration which is finer than the value predetermined by the pixel spacing 11. Mathematically the transforms describe the changes in the IR images which can be caused by changes in the recording conditions, in particular translations, rotations and scaling.

A test set 16 of point spread functions 17 is stored in a storage medium of the image-processing unit 10.

These point spread functions 17 mathematically describe the optical imaging properties of the IR optical unit 2 and/or of the IR detector unit 3 for different alignments of the beam path of the thermal imaging camera 1.

Hence, the parameters of the aforementioned transforms can be assigned to the different point spread functions 17 in analogous fashion.

According to the mathematical description known per se, in relation to a two-dimensional function representing the scene, the IR image 4 recorded at the IR detector unit 3 emerges by convoluting this function with that point spread function 17 that characterizes the current recording conditions.

For simplification purposes, the utilizable point spread functions 17 are reproduced as one-dimensional delta functions in FIG. 4, with the actually used, two-dimensional point spread functions 17 emerging as a product of two one-dimensional delta functions. These delta functions are characterized by the position of the centre 18 thereof, i.e. of the mathematical support thereof. Different positions of the centre 18 therefore correspond to different image displacements. The point spread functions 17 therefore can be transformed into one another by translations.

The point spread functions are automatically symmetric as a result of the separable representation of the point spread functions 17 as a product of two delta functions. In other exemplary embodiments, use is made of other, likewise symmetric but not separable functions. An additional advantage of separable point spread functions 17 is that the two-dimensional convolution integrals can be calculated in a simplified fashion. This calculation is preferably brought about by means of an FFT. As a result of the simplifications of the point spread function, the calculations can even be carried out in position space.

Figure 3:
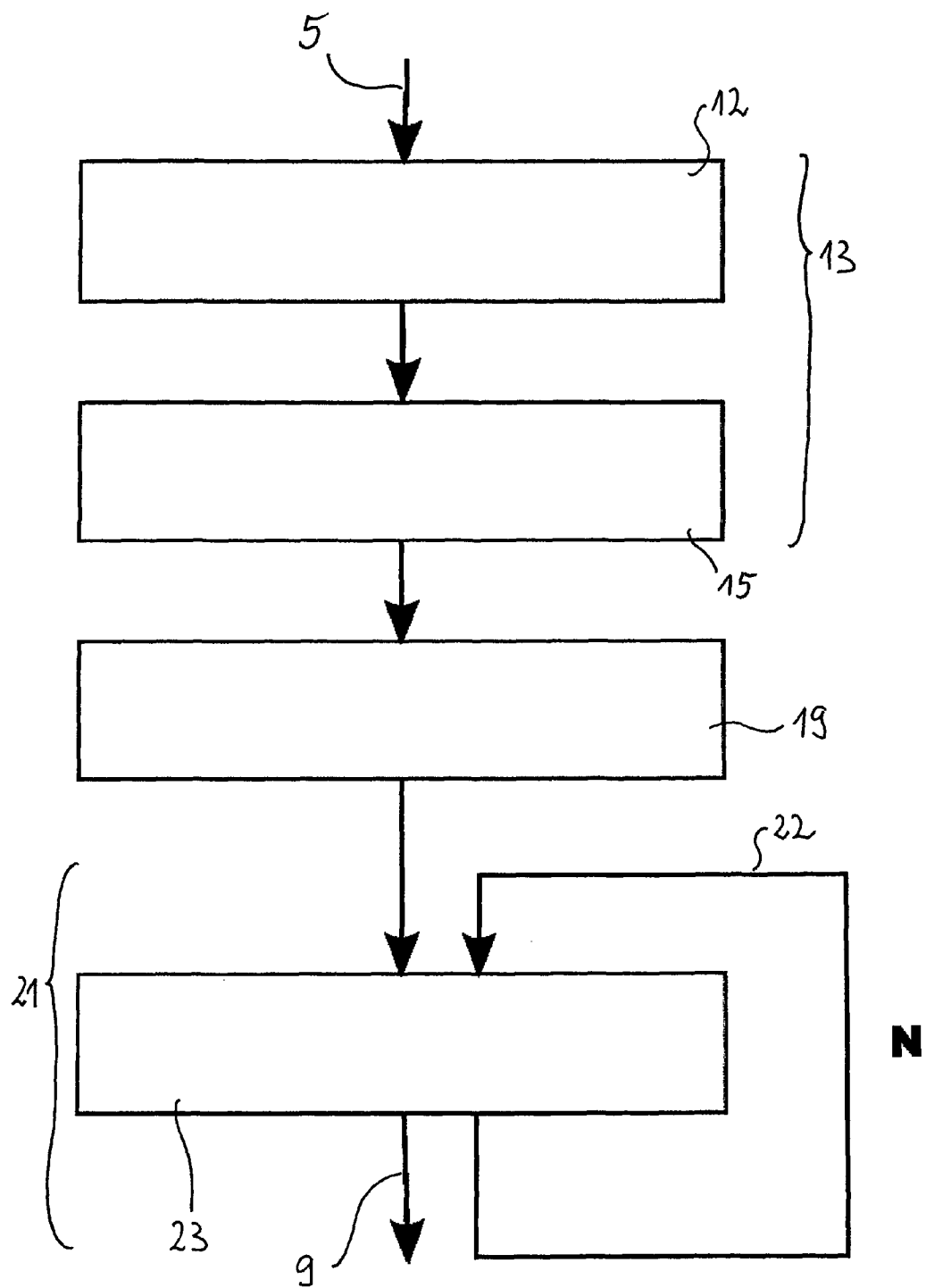
FIG. 3 shows a flowchart of the method according to the invention.

In the method according to the invention as per FIG. 3, each IR image 4 of the IR image data stream 5 is now, in an assignment step 19, assigned that point spread function 17 from the test set 16 which belongs to the transform calculated in the registration method 13.

Using the now available information and data, it is now possible to carry out the combination 20 according to the invention of the IR images 4 of the IR image data stream 5 to form the SR-IR image 9.

To this end, a test pixel matrix, which has the output-image resolution of the SR-IR image 9, is initially filled with image values 24 of the IR images 4 such that the pixel positions of the pixels filled by the IR images 4 at least approximately reproduce the image displacement of the relevant IR image 4 with respect to the IR reference image 14.

The filled test pixel matrix forms a start point for an optimization method 21, in which the optimized SR-IR image 9 is calculated. In the optimization method 21, the SR-IR image 9 is varied in a loop 22 and, each time the loop is passed through, an energy function is evaluated in an evaluation step 23. For the purposes of evaluating the energy function, the SR-IR image 9 currently provided in the loop 22 is convoluted with the associated point spread function 17 for each IR image 4 and compared to the IR image 4. This establishes which IR image would have emerged for the SR-IR image 9, tentatively generated in the loop 22, under the recording conditions determined in the registration method 13. The deviations of this hypothetical IR image from the actually recorded IR image 4 are subsequently evaluated by forming the difference and magnitude and summed in the energy function for the IR images 4.

The energy function can have further terms which simulate additional influences during optical imaging, for example noise and/or aberrations of the IR optical unit 2 or the detector unit 3.

By way of example, it is possible to use an energy function as per J. Flusser et al.: A Unified Approach to Superresolution and Multichannel Blind Deconvolution, IEEE Transactions on Image Processing, volume 16, number 9, September 2007, pages 2322-2332. Using the simplified method present here, there is no need to vary both SR-IR image and point spread function; varying one of the two suffices.

As soon as the optimization method 21 has established the optimum SR-IR image 9, the latter is output and displayed on the output unit 8 of the thermal imaging camera 1.

The method according to the invention proceeds continuously, with the respectively selected IR images 4 of the IR image data stream 5 for calculating the SR-IR image 9 being selected from a window co-moving in the time profile of the IR image data stream 5.

Hence, as a result of this continuous embodiment of the method according to the invention, an image data stream of SR-IR images 9 with an increased resolution is likewise available at the output unit 8.

In the thermal imaging camera 1, provision is made for recording an IR image data stream 5 of IR images 4 during a random movement of the thermal imaging camera 1 and for combining these IR images 4 to form a higher resolution SR-IR image 9.

The invention claimed is:

1. Method for preparing NON-VIS (non-visible) images for improving image resolution, comprising: at least one of during or before and after a random movement of a camera for recording NON-VIS images in a non-visible spectral range, including at least one of an IR (infrared), UV (ultraviolet), THz (terahertz), or microwave spectral range, or at least one of during or before and after a random movement of a moving vehicle carrying a camera for recording NON-VIS images in the non-visible spectral range which results in a random movement of the camera, recording a NON-VIS image data stream of the NON-VIS images with a recorded-image resolution and, as a result of combining the recorded NON-VIS images, generating a prepared SR (superresolution) image with an output-image resolution with the output-image resolution being greater than the recorded-image resolution, wherein, prior to combining the recorded NON-VIS images, establishing a transform for each of the NON-VIS images, by which the NON-VIS images are registered with sub-pixel accuracy with respect to one another or with respect to a reference, wherein, prior to combining the recorded NON-VIS images, assigning a point spread function to each of the NON-VIS images from a stored test set of the point spread functions, with the point spread functions of the test set simulating an optical imaging process of the camera for at least one of different recording directions or different recording positions, and the point spread function corresponding to the respectively established transform being assigned to each of the recorded NON-VIS images, wherein the test set stores the point spread functions which are separable, an energy function is optimized for a combination of the recorded NON-VIS images, with the energy function being evaluated on NON-VIS images tentatively combined to form an SR image, the SR image is varied during the optimization of the energy function and the point spread functions assigned to the NON-VIS images are varied during the optimization of the energy function, by displacing a center of the respective point spread function, and the registration with sub-pixel accuracy is established pixel-by-pixel and pixel values which deviate from the respectively established registration by more than a predetermined threshold are masked in the respective NON-VIS image.

2. Method according to claim 1, wherein prior to combining the recorded NON-VIS images, the point spread function is assigned to each of the NON-VIS images from the stored test set of the point spread functions, with the point spread functions of the test set simulating the optical imaging properties of the camera for at least one of different recording directions or different recording positions, with the point spread function corresponding to the respectively established transform being assigned to each of the recorded NON-VIS images.

3. Method according to claim 1, wherein at least one of the test set stores the point spread functions which describe different relative image displacements, the test set stores the point spread functions which can be transformed into one another by translation or the test set stores point spread functions which are symmetrical.

4. Method according to claim 3, wherein as a start point of the optimization of the energy function, a test pixel matrix of the output-image resolution is filled with image values of the NON-VIS images, depending on at least one of the respectively established transform or the respectively assigned point spread function, and used as tentatively generated SR image.

5. Method according to claim 1, wherein the energy function evaluates a deviation of the recorded NON-VIS images from the SR image tentatively generated in a loop in the optimization, which is imaged with the respectively selected point spread function.

6. Method according to claim 1, wherein one of the NON-VIS images is selected from the NON-VIS image data stream as a NON-VIS reference image or the method is carried out continuously with a NON-VIS reference image co-moving within the progressing NON-VIS image data stream or with selected ones of the NON-VIS images co-moving within the progressing NON-VIS image data stream.

7. Method according to claim 1, wherein the output-image resolution of the SR image is SRF-times an image resolution of the NON-VIS images and the predetermined number of NON-VIS images to be selected is at least equal to SRF.

8. Method according to claim 1, wherein the registration with sub-pixel accuracy for each of the NON-VIS images is established in a two-stage method, with, in a first method step, an approximate registration being established by a phase-correlation method, or with, in a second method step, the registration with sub-pixel accuracy being established by an optical flow.

9. Method according to claim 1, wherein a convolution of the respective SR image with the respective point spread function is calculated when imaging the SR images with the selected point spread functions.

10. Camera for recording NON-VIS images in a non-visible spectral range, comprising a detector unit designed to generate a NON-VIS image data stream of NON-VIS images, an image-processing unit designed to process the NON-VIS image data stream and having an output unit designed to output prepared SR images, the image-processing unit is designed to carry out a method according to claim 1, with the recorded-image resolution being predetermined by the detector unit and the output-image resolution being greater than the recorded-image resolution.

11. Measuring arrangement, comprising a camera for recording NON-VIS images in a non-visible spectral range with the camera having a detector unit designed to generate a NON-VIS image data stream of NON-VIS images, an image-processing unit designed to process the NON-VIS image data stream and an output unit designed to output prepared SR images, the image-processing unit is designed to carry out a method according to claim 1, wherein with the recorded-image resolution being predetermined by the detector unit and the output-image resolution being greater than the recorded-image resolution.

\* \* \* \* \*